(12) United States Patent
Fu et al.

(10) Patent No.: US 10,305,873 B2
(45) Date of Patent: May 28, 2019

(54) METHOD, APPARATUS, AND SYSTEM FOR QUANTUM KEY DISTRIBUTION

(71) Applicant: ALIBABA GROUP HOLDING LIMITED, George Town (KY)

(72) Inventors: Yingfang Fu, Beijing (CN); Shuanlin Liu, Hangzhou (CN); Yabin Gao, Beijing (CN); Xiuzhong Chen, Beijing (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 487 days.

(21) Appl. No.: 14/993,643

(22) Filed: Jan. 12, 2016

(65) Prior Publication Data

US 2016/0226846 A1 Aug. 4, 2016

(30) Foreign Application Priority Data

Jan. 22, 2015 (CN) .......................... 2015 1 0033128

(51) Int. Cl.
*H04L 29/06* (2006.01)
*H04L 9/08* (2006.01)

(52) U.S. Cl.
CPC .......... *H04L 63/062* (2013.01); *H04L 9/0852* (2013.01); *H04L 9/0855* (2013.01); *H04L 63/061* (2013.01); *H04L 63/0823* (2013.01)

(58) Field of Classification Search
None
See application file for complete search history.

(56) References Cited

U.S. PATENT DOCUMENTS 7,864,958 B2  1/2011  Harrison et al.
8,488,790 B2  7/2013  Wellbrock et al.
(Continued)

FOREIGN PATENT DOCUMENTS

CN   101599826 A   12/2009
CN   201430596 Y    3/2010
(Continued)

OTHER PUBLICATIONS

Elaine Barker et al., Recommendation for Key Management—Part 1: General (Revision 3), NIST Special Publication 800-57, Computer Security Division, Information Technology Laboratory, National Institute of Standards and Technology, Jul. 2012 (15 pages).

(Continued)

*Primary Examiner* — Michael R Vaughan
(74) *Attorney, Agent, or Firm* — Finnegan, Henderson, Farabow, Garrett & Dunner, LLP

(57) ABSTRACT

A quantum key distribution system includes a quantum security key management (QSKM) device, a plurality of quantum security key distribution (QSKD) devices, and a quantum security key service (QSKS) device. The QSKD device splits an identity-based system private key into a plurality of system sub-private keys, and distributes the plurality of system sub-private keys to a corresponding number of the QSKD devices. The QSKS device forwards a request for acquiring an authorized private key from a first QSKD device to a predetermined number of second QSKD devices. The predetermined number of second QSKD devices each generate an identity-based authorized sub-private key from the system sub-private key. The first QSKD device acquires, from the predetermined number of second QSKD devices, the identity-based authorized sub-private keys, and reconstructs an identity-based authorized private key based on the identity-based authorized sub-private keys.

39 Claims, 7 Drawing Sheets

(56) References Cited

U.S. PATENT DOCUMENTS

| | | | |
|---|---|---|---|
| 9,692,595 B2* | 6/2017 | Lowans | H04L 9/0858 |
| 2002/0199108 A1 | 12/2002 | Chuang et al. | |
| 2003/0112970 A1* | 6/2003 | Mitra | H04L 9/0852 |
| | | | 380/44 |
| 2005/0078826 A1 | 4/2005 | Takeuchi | |
| 2005/0259825 A1* | 11/2005 | Trifonov | H04L 9/0858 |
| | | | 380/277 |
| 2007/0076884 A1 | 4/2007 | Wellbrock et al. | |
| 2007/0192598 A1 | 8/2007 | Troxel et al. | |
| 2009/0106551 A1 | 4/2009 | Boren et al. | |
| 2009/0175452 A1 | 7/2009 | Gelfond et al. | |
| 2010/0226659 A1 | 9/2010 | Nishioka et al. | |
| 2010/0299526 A1 | 11/2010 | Wiseman et al. | |
| 2010/0329459 A1 | 12/2010 | Wiseman et al. | |
| 2011/0085666 A1* | 4/2011 | Hicks | H04L 9/0852 |
| | | | 380/278 |
| 2011/0213979 A1 | 9/2011 | Wiseman et al. | |
| 2011/0317836 A1 | 12/2011 | Yeh et al. | |
| 2012/0082312 A1 | 4/2012 | Liu et al. | |
| 2012/0177201 A1* | 7/2012 | Ayling | H04B 10/70 |
| | | | 380/278 |
| 2013/0083926 A1 | 4/2013 | Hughes et al. | |
| 2013/0208894 A1 | 8/2013 | Bovino | |
| 2013/0251145 A1* | 9/2013 | Lowans | H04L 9/0838 |
| | | | 380/44 |
| 2014/0089663 A1* | 3/2014 | Tanizawa | H04L 63/06 |
| | | | 713/168 |
| 2014/0205089 A1 | 7/2014 | Irwin | |
| 2015/0149787 A1* | 5/2015 | Panchapakesan | H04L 63/083 |
| | | | 713/184 |
| 2016/0241396 A1* | 8/2016 | Fu | H04L 9/0858 |
| 2017/0124348 A1* | 5/2017 | Pourzandi | G06F 21/602 |
| 2017/0237558 A1* | 8/2017 | Yuan | H04L 9/0858 |
| | | | 380/279 |

FOREIGN PATENT DOCUMENTS

| | | |
|---|---|---|
| CN | 103338448 A | 10/2013 |
| CN | 104219042 A | 12/2014 |

OTHER PUBLICATIONS

Adolfo Barbosa do Amaral Peixinho, "Digital Certificates and Threshold Cryptography", Department of Computer Science, University of Beira Interior, Oct. 19, 2013 (4 pages).

PCT International Search Report and Written Opinion dated Mar. 11, 2016, issued in corresponding International Application No. PCT/US2016/012988 (22 pages).

European Patent Office Communication issued for Application No. 16740513.3-1218 which encloses the extended European Search Report which includes pursuant to Rule 62 EPC, the Supplementary European Search Report (Art. 153(7) EPC) and the European search opinion, dated May 22, 2018, 7 pages.

First Chinese Search Report issued in Chinese Application No. 201510033128.2, dated May 28, 2018 (1 page).

First Chinese Office Action issued in Chinese Application No. 201510033128.2, dated Jun. 5, 2018 (25 pages).

Yun Lan et al., "A secret-sharing-based key management in Wireless Sensor Network," 2013 IEEE 4th International Conference on Software Engineering and Service Science, May 23, 2013 (4 pages).

* cited by examiner

METHOD, APPARATUS, AND SYSTEM FOR QUANTUM KEY DISTRIBUTION

CROSS REFERENCE TO RELATED APPLICATION

The present application is based on and claims the benefits of priority to Chinese Application No. 201510033128.2, filed Jan. 22, 2015, the entire contents of which are incorporated herein by reference.

TECHNICAL FIELD

The present application relates to quantum key technologies, in particular to methods, apparatus, and systems for quantum key distribution.

BACKGROUND

With development of computers and network technologies, systems providing various services for users emerge, including, for example, cloud computing systems that provide applications, data and IT services for users. In such systems, to ensure security of stored static data and generated dynamic data, it is necessary to encrypt the data with an encryption algorithm. For example, in a cloud computing environment, two data encryption modes are typically used: a first encryption mode based on certificate authentication and a second encryption mode based on cloud computing key management.

The basic principle of the certificate-based encryption authentication mode is as follows: a server in the system controls and saves keys by itself; when encrypting and storing the static data, the server uses symmetric keys to encrypt the data, and then uses a digital certificate to encrypt the symmetric keys (i.e., using a public key to encrypt the symmetric keys) and stores the encrypted data; when reading the data, the server or another server first uses a private key to decrypt the symmetric keys and then uses the decrypted symmetric keys to decrypt the data.

Compared with the certificate-based encryption authentication mode, the encryption mode that uses a cloud computing key management system is more widely applied to cloud computing environments, and is also the foundation of the security of cloud data.

FIG. 1 is an exemplary cloud computing key management system. The cloud computing key management system includes two parts, i.e., a cloud computing key client end and a cloud computing key management service end. The cloud computing key client end resides in a cloud computing server and is responsible for providing a key service for cloud computing applications in the cloud computing server. The cloud computing key client end uses a standard key management protocol to apply for management services such as key generation, key recovery and key update to the cloud computing key management service end. The cloud computing key management service end applies for corresponding services to a symmetric password management server according to a service application type, and then returns a key service operation result to the cloud computing key client end, and may also act on behalf of the cloud computing key client end to apply for the corresponding services to a digital certificate center.

Because both modes use classical cryptography based on computational complexity, they can potentially be cracked in light of the emergence of cloud computing, quantum computing, and other computing technologies. In addition, for the first mode, the encrypted key must be kept safe. Once lost or damaged, the key or data cannot be recovered. For the second mode, although handing over the key to the system for central management improves security, administrators of the key management server, who have higher operation permissions, can access user data and keys, may give away the keys and user confidential information.

SUMMARY

One aspect of the present disclosure is directed to a quantum key distribution system. The quantum key distribution system includes a quantum security key management device, a plurality of quantum security key distribution devices connected with the quantum security key management device, and a quantum security key service device connected with the quantum security key management device and the plurality of quantum security key distribution devices. The quantum security key management device splits an identity-based system private key into a plurality of system sub-private keys, and distributes the plurality of system sub-private keys to a corresponding number of the quantum security key distribution devices. The quantum security key service device forwards a request for acquiring an authorized private key from a first quantum security key distribution device of the plurality of quantum security key distribution devices to a predetermined number of second quantum security key distribution devices of quantum security key distribution devices. The predetermined number of second quantum security key distribution devices each generate an identity-based authorized sub-private key from the system sub-private key. The first quantum security key distribution device acquires, from the predetermined number of second quantum security key distribution devices, the identity-based authorized sub-private keys, and reconstructs an identity-based authorized private key based on the identity-based authorized sub-private keys.

Another aspect of the present disclosure is directed to a quantum key distribution method. The quantum key distribution method includes receiving, by a quantum security key service device, a request for acquiring an authorized private key from a first quantum security key distribution device of a requester, the request at least carrying identifier information of the requester, forwarding, by the quantum security key service device, the request to a predetermined number of second quantum security key distribution devices, receiving, by the first quantum security key distribution device of the requester, a plurality of authorized sub-private keys generated, by the predetermined number of second quantum security key distribution devices, based on the identifier information of the requester and a plurality of system sub-private keys, and reconstructing, by the first quantum security key distribution device of the requester, an identity-based authorized private key based on the authorized sub-private keys.

Consistent with some embodiments of the present disclosure, the reconstructing, by the first quantum security key distribution device of the requester, the identity-based authorized private key based on the authorized sub-private keys includes reconstructing, by the first quantum security key distribution device of the requester, the identity-based authorized private key may be implemented by using a threshold secret sharing mechanism.

Consistent with some embodiments of the present disclosure, the quantum key distribution method may further include, before receiving the request by the quantum security key service device, splitting, by a quantum security key management device, an identity-based system private key into the plurality of system sub-private keys by using the threshold secret sharing mechanism, and sharing, by the quantum security key management device, the plurality of system sub-private keys with a corresponding number of quantum security key distribution devices.

Another aspect of the present disclosure is directed to another quantum key distribution method. The quantum key distribution method include splitting, by a quantum security key management device, an identity-based system private key into a plurality of system sub-private keys, distributing, by the quantum security key management device, the plurality of system sub-private keys to a corresponding number of quantum security key distribution devices, receiving, by a quantum security key service device, a request for acquiring an authorized private key from a first quantum security key distribution device of a requester, the request at least carrying identifier information of the requester, forwarding, by the quantum security key service device, the request to a predetermined number of second quantum security key distribution devices of the corresponding number of quantum security key distribution devices, receiving, by the first quantum security key distribution device, a plurality of authorized sub-private keys generated, by the predetermined number of second quantum security key distribution devices, based on the identifier information of the requester and a plurality of system sub-private keys, and reconstructing, by the first quantum security key distribution device of the requester, an identity-based authorized private key based on the authorized sub-private keys.

Consistent with some embodiments of the present disclosure, the quantum key distribution method may further include generating, by the quantum security key management device, the system private key by using a random number generated by a quantum noise source, identifier information of a quantum key distribution system, and timestamp information.

Consistent with some embodiments of the present disclosure, the splitting, by a quantum security key management device, an identity-based system private key into a plurality of system sub-private keys may be implemented by using a threshold secret sharing mechanism based on Lagrange interpolation.

Consistent with some embodiments of the present disclosure, the reconstructing, by the first quantum security key distribution device of the requester, an identity-based authorized private key based on the authorized sub-private keys may be implemented by using a threshold secret sharing mechanism based on Lagrange interpolation.

Another aspect of the present disclosure is directed to a quantum key distribution apparatus. The apparatus includes a private key request receiver unit that receives a request for acquiring an authorized private key from a first quantum security key distribution device of a requester, the request at least carrying identifier information of the requester, a private key request forwarding unit that forwards the request to a predetermined number of second quantum security key distribution devices, an authorized sub-private key sharing unit that generates a plurality of authorized sub-private keys based on the identity of the requester and a plurality of system sub-private keys and that shares the authorized sub-private keys with the first quantum security key distribution device of the requester, and an authorized private key reconstructing unit that reconstructs an identity-based authorized private key based on the authorized sub-private keys.

Another aspect of the present disclosure is directed to a non-transitory computer readable medium storing one or more programs. The one or more programs comprises instructions which, when executed by a computer system including a quantum security key service device and a first quantum security key distribution device, cause the computer system to perform a method comprising: receiving, by the quantum security key service device, a request for acquiring an authorized private key from the first quantum security key distribution device of a requester, the request at least carrying identifier information of the requester, forwarding, by the quantum security key service device, the request to a predetermined number of second quantum security key distribution devices, receiving, by the first quantum security key distribution device of the requester, a plurality of authorized sub-private keys generated, by the predetermined number of second quantum security key distribution devices, based on the identifier information of the requester and a plurality of system sub-private keys, and reconstructing, by the first quantum security key distribution device of the requester, an identity-based authorized private key based on the authorized sub-private keys.

Another aspect of the present disclosure is directed to a non-transitory computer readable medium storing one or more programs. The one or more programs comprising instructions which, when executed by a computer system including a quantum security key management device, a quantum security key service device, and a first quantum security key distribution device, cause the computer system to perform a method comprising: splitting, by the quantum security key management device, a system private key into a plurality of system sub-private keys, distributing, by the quantum security key management device, the plurality of system sub-private keys to a corresponding number of quantum security key distribution devices, receiving, by the quantum security key service device, a request for acquiring an authorized private key from the first quantum security key distribution device of a requester, the request at least carrying identifier information of the requester, forwarding, by the quantum security key service device, the request to a predetermined number of second quantum security key distribution devices of the corresponding number of quantum security key distribution devices, receiving, by the first quantum security key distribution device, a plurality of authorized sub-private keys generated, by the predetermined number of second quantum security key distribution devices, based on the identifier information of the requester and a plurality of system sub-private keys, and reconstructing, by the first quantum security key distribution device of the requester, an identity-based authorized private key based on the authorized sub-private keys.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Consistent with some embodiments of the present disclosure, a quantum key distribution system is provided. The quantum key distribution system provided in this example includes: a quantum security key management (hereinafter referred to as QSKM) device, a plurality of quantum security key distribution (hereinafter referred to as QSKD) devices, a quantum security key service (hereinafter referred to as QSKS) device, and data devices used as a source end and a destination end of secured data transmission. The QSKM device is connected with the plurality of QSKD devices and the QSKS device, each QSKD device is connected at least with a number of other QSKD devices, and the data device is connected at least with one QSKD device. The QSKM, QSKD, and QSKS devices can be implemented by computers or servers with one or more processors and memories. The memory may be a non-transitory computer-readable storing medium storing instructions, that when executed by the processor, perform functions described below.

In some embodiments, one or more of the plurality of QSKD devices may include the QSKS device. In other words, functions of the QSKD device and the QSKS device may be integrated into one physical device, and may also be implemented by different physical devices respectively.

In addition, in order to meet the requirement of long distance transmission of a quantum key, the quantum key distribution system may further include routing devices configured to relay the quantum key and forward data, so that the QSKM device, the QSKD device and the QSKS device can be interconnected through the routing devices.

Figure 1:
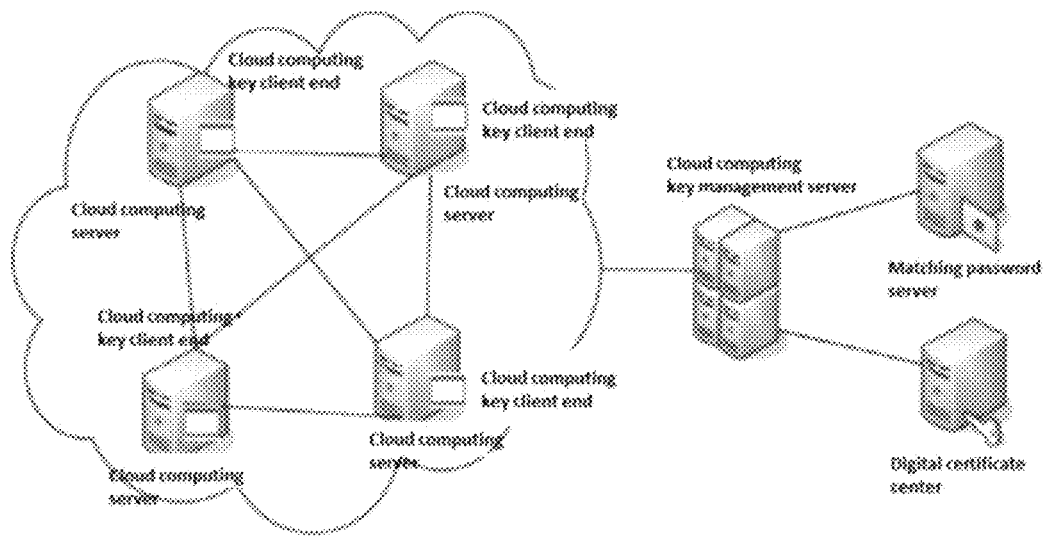
FIG. 1 is an exemplary cloud computing secured key management system in the prior art.
Figure 2:
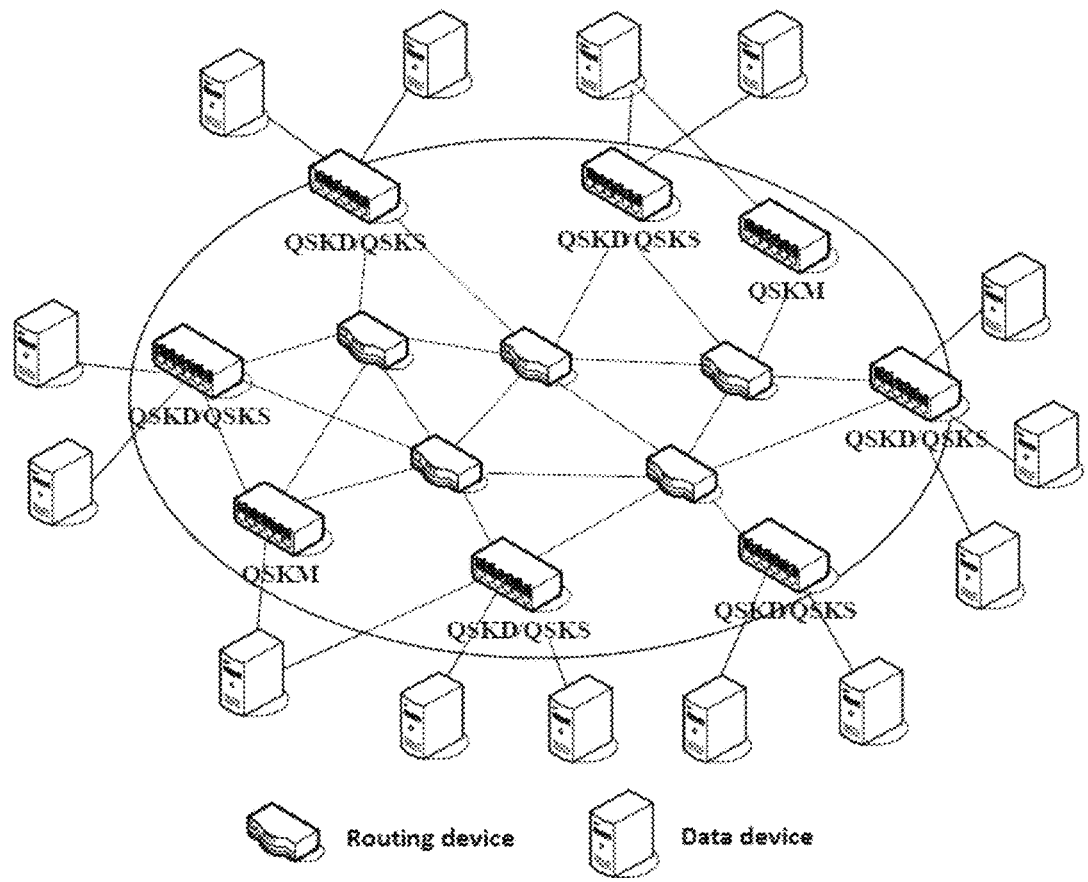
FIG. 2 is a graphical illustration of a quantum key distribution system, according to an exemplary embodiment.

FIG. 2 is a graphical illustration of a quantum key distribution system, according to an exemplary embodiment. In this embodiment, two QSKM devices standby for each other are included, functions of the QSKD and the QSKS are integrated into one physical device (represented by QSKD/QSKS), and the QSKM device and the QSKD/QSKS device are connected with each other through a routing device. Although the QSKD and QSKS are integrated into one physical device in some exemplary implementations, the functions implemented by the QSKD and QSKS may be different. Specific functions of the QSKM device, the QSKD device and the QSKM device and their coordination with each other are described from the perspective of functional division.

Figure 3:
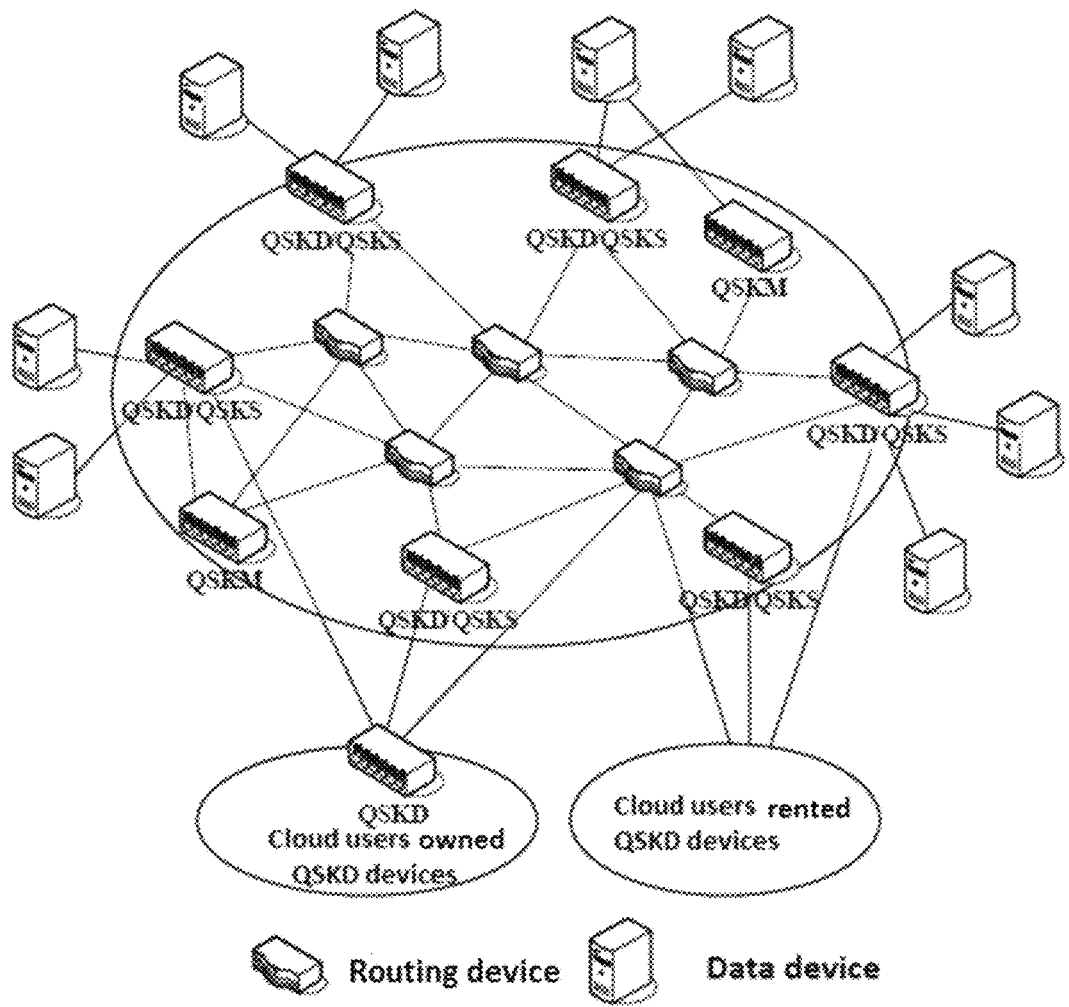
FIG. 3 is a graphical illustration of another quantum key distribution system, according to another exemplary embodiment.

FIG. 3 is a graphical illustration of another quantum key distribution system, according to an exemplary embodiment. In this embodiment, some QSKD devices are owned by some cloud users and some QSKD devices are rented by some cloud users.

Figure 4:
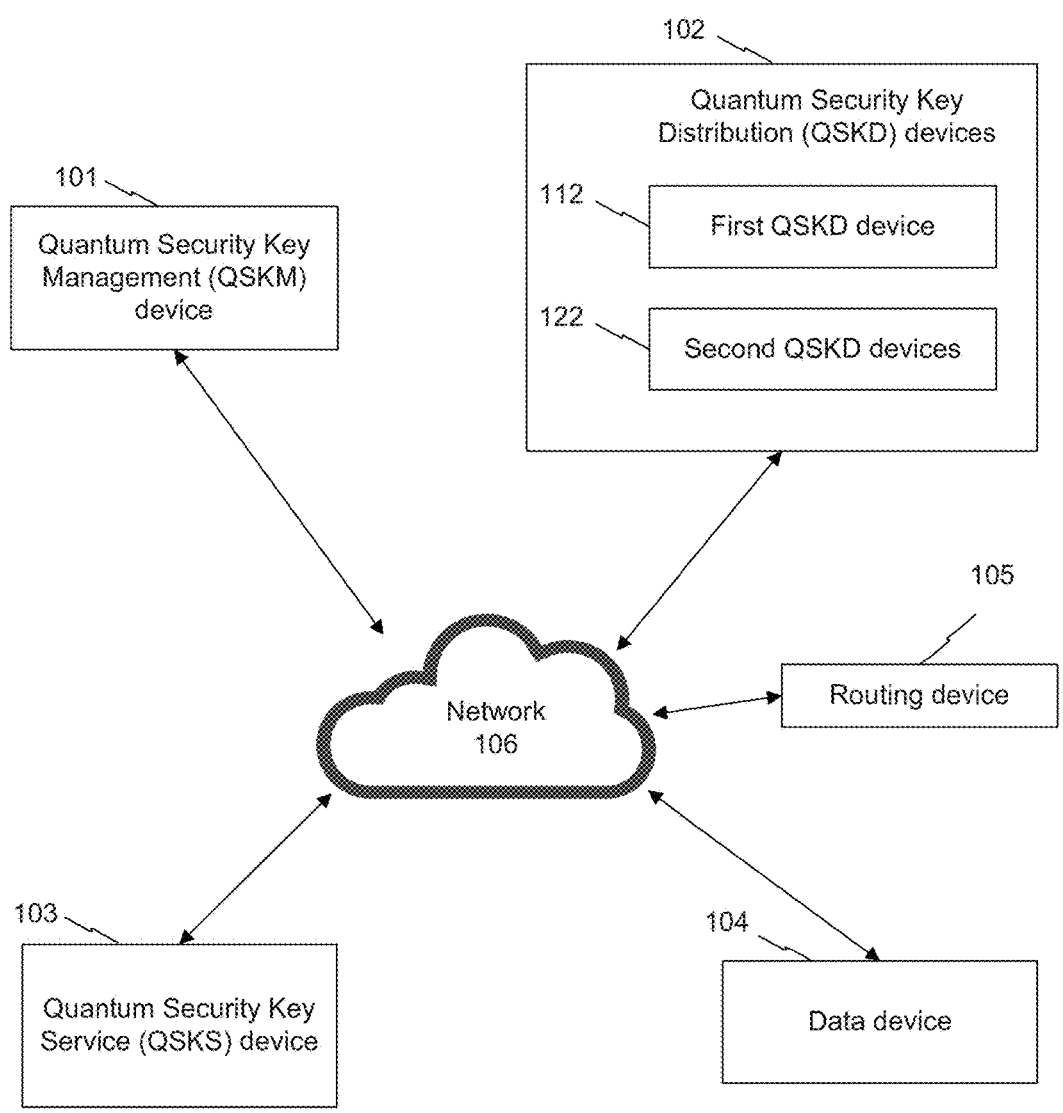
FIG. 4 is a block diagram illustrating a quantum key distribution system, according to a further exemplary embodiment.

FIG. 4 is a block diagram illustrating a quantum key distribution system 100 shown in FIGS. 2 and 3, according to an exemplary embodiment. The system 100 includes a number of components, some of which may be optional. The system 100 includes a QSKM device 101, a plurality of QSKD devices 102, a QSKS device 103, a data device 104, and a routing device 105 all connected through a network 106. The plurality of QSKD devices 102 include a first QSKD device 112 and a plurality of second QSKD devices 122. The first QSKD device and the plurality of second QSKD devices may be structurally and functionally similar or identical devices. The grouping/classification of these QSKD devices is for illustration purposes.

In some embodiments, the QSKD device and the QSKS device are integrated in one physical device, and the QSKM device and the QSKD/QSKS device are connected with one another through the routing device. In some embodiments, the system 100 includes two QSKM devices, each being a backup of the other.

In some embodiments, the QSKM device is a manager of the quantum key distribution system, and the system may include one or more QSKM devices to achieve data synchronization and realize centralized management of the system. The QSKM device is responsible for splitting an identity-based system private key into a plurality of system sub-private keys in accordance with a threshold secret sharing mechanism, and respectively distributing the plurality of system sub-private keys to a corresponding number of the QSKD devices in accordance with quantum key agreement.

In some embodiments, the identity-based system private key may be preset in the QSKM device, or may be generated by the QSKM device as follows: the identity-based system private key is generated in accordance with a random number generated by a quantum noise source, identifier information of the system and timestamp information. The reason why the random number generated by the quantum noise source is introduced is to increase security of the system private key by using random characteristics of quantum noise. For example, the system private key can be generated through Formula 1:

$$S = S_r \oplus (BN_{ID}/\text{expire\_time}) \quad \text{Formula 1}$$

in which $S_r$ is the random number generated by the quantum noise source, $BN_{ID}$ is the identifier information of the system, expire_time is the timestamp information, and S is the identity-based system private key. The QSKM device can store the system private key (also called system key) in a system key database, which is only accessible to the QSKM device.

In some embodiments, the QSKM device splits the identity-based system private key preset or generated as described above into a plurality of system sub-private keys in accordance with a threshold secret sharing mechanism, and respectively distributes the plurality of system sub-private keys to a corresponding number of the QSKD devices in accordance with a quantum key agreement.

The reason why, in some embodiments, the identity-based system private key is split into a plurality of (at least two) identity-based system sub-private keys and distributed to a corresponding number of QSKD devices is to achieve distributed management of keys, and when the first QSKD device (or any other QSKD device) applies for acquiring an authorized private key, a predetermined number of sub-private keys under decentralized management can be combined. In this way, abuse of power caused by excessive centralization of key management rights can be avoided, thus effectively reducing the possibility that the administrator acquires and maliciously gives away user data. Moreover, in the event of key damage, it is also feasible to reacquire the predetermined number of sub-private keys and reconstructs the key.

In some embodiments, the QSKM device splits the system private key into a plurality of identity-based system sub-private keys by using a threshold secret sharing mechanism. The threshold secret sharing mechanism is known as a (n, t) threshold secret sharing mechanism, and the mechanism is defined as follows: a secret S is distributed to n members for sharing through a secret sharing algorithm, so that each member holds a secret sub (a part of the secret S), and the following two conditions are met:

(1) any number of members, the number of which is no less than t, can reconstruct the secret S with the secret subs they hold; and (2) any number of members, the number of which is less than t, cannot reconstruct the secret S with the secret subs they hold.

There are many schemes for realizing the aforementioned secret sharing mechanism, for example, a threshold secret sharing scheme based on Lagrange interpolation, or a Blakley threshold secret sharing scheme based on multi-dimensional space, and each scheme has its own secret sharing algorithm and a secret reconstruction algorithm corresponding thereto. These schemes are also called secret sharing mechanisms.

In some embodiments, if the system includes n QSKD devices, the QSKM device can split the system private key into n system sub-private keys, according to the preset t value.

In some embodiments, the threshold secret sharing mechanism based on Lagrange interpolation is used. The QSKM device can use the secret sharing algorithm shown in Formula 2 and Formula 3 to split the identity-based system private key S into n sub-private keys $S_i$, in which a prime number $\varphi$ in Formula 2 is greater than the total number n of QSKD devices that participate into private key management and is greater than the maximum value that the system private key S may be set, $\alpha_0 = h(0) = S$, and $\alpha_{t-1}, \ldots, \alpha_1$ are random coefficients generated by quantum noise; all the coefficients should be kept secured and are destroyed after n sub key shares $S_i$ are generated.

$$h(x) = \alpha_{t-1}x^{t-1} + \ldots + \alpha_1 x \pm \alpha_0 \bmod \varphi \quad \text{Formula 2}$$

$$s_i = h(x_i) \bmod \varphi x_i = i, \ i = 1, \ldots, n \quad \text{Formula 3}$$

In this example, the identity-based system private key is split into a corresponding number in accordance with the number n of the QSKD devices, and in some embodiments, distributed management of keys can also be realized as long as the system private key is split into a plurality of system sub-private keys.

In some embodiments, the QSKM device is further configured to, after the split, respectively distribute the plurality of system sub-private keys to a corresponding number of QSKD devices in accordance with the quantum key agreement. If the QSKM obtains n system sub-private keys $S_1$, $S_2, \ldots S_n$ through splitting, the QSKM shares the $S_1$, $S_2, \ldots S_n$ with $QSKD_1$, $QSKD_2, \ldots QSKD_n$ respectively in accordance with the quantum key agreement, e.g. a BB84 protocol.

In some embodiments, in consideration of light loss and bit error rate, in order to ensure that the QSKM device and the QSKD devices can correctly share each system sub-private key, when the $S_1$, $S_2, \ldots S_n$ are converted to a quantum state for key agreement, a quantum key agreement of redundancy transmission or on-demand retransmission can be used.

The redundancy transmission refers to transmitting the same bit over a certain proportion, that is, transmitting the same bit multiple times, in which the proportion can be determined based on a bit error rate, a transmission distance, a rate of loss and other factors; the on-demand retransmission refers to that a receiver device can know whether there are unreceived photons (for example, effective detection cannot be carried out due to attenuation) through a synchronization mechanism, and can judge which of the received quantum states are wrong by comparing measurement bases of classical channels. The receiver device can send the non-receiving and wrong quantum state information to the QSKM device, so that the QSKM device can repeatedly transmit particular quantum states one or more times in accordance with demands of the receiver device. By using the two methods above, the receiver device may successfully receive the same bit multiple times, and can keep 1 bit in this situation.

In some embodiments, it is also possible to use another method for the quantum key agreement, as long as the method can ensure that the QSKM device and each QSKD device can share each system sub-private key correctly.

In some embodiments, as a manager of the system, the QSKM device needs to communicate with each device of the system so as to realize necessary management functions. In order to increase security of data transmission and facilitate verification of the devices in the system on the identity of the manager, the QSKM device may be further configured to generate an identity-based private key thereof and a corresponding signature certificate by using a random number generated by a quantum noise source, identifier information and timestamp information. The certificate includes identifier information of the QSKM (e.g., ID of the QSKM device), and signature information using the private key thereof. For example, the system may generate an identity-based private key of the QSKM by using Formula 4.

$$QSKM_{PK} = QSKM_r \oplus (QSKMF_{ID}/\text{expire\_time}) \quad \text{Formula 4}$$

in which $QSKM_{ID}$ is the identifier information of the QSKM, $QSKM_r$ is the random number generated by the QSKM by using a quantum noise source, expire_time is timestamp information, and $QSKM_{PK}$ is the identity-based private key of the QSKM.

The QSKM device can store the identity-based private key and the corresponding signature certificate into its own key/certificate database. As this example uses an identity-based public key encryption technology, identifier information (for example, ID) and the certificate are open through the whole network, while the identity-based private key is confidential and is generally accessible to a device or user that generates or owns the private key and accessible to authorized devices.

In addition, in order to facilitate management and enable generation of the identity-based private key for transmitting secured data, the devices in the quantum key distribution system can have identifier information (for example, ID) that can be distinguished from other devices, and the identifier information may be preset in each device and may also be uniformly assigned and managed by the manager QSKM in the system. In one embodiment, the QSKM device is further configured to, in accordance with a registration request received from the QSKD device or the QSKS device, generate identifier information for the QSKD device or the QSKS device, and issue the identifier information to the corresponding device. If the QSKD device and the QSKS device are integrated into the same physical device, the QSKM may issue one ID for the QSKD device and the QSKS device and may also issue two IDs for the QSKD device and the QSKS device respectively.

In some embodiments, one main function of the QSKS device in the system is forwarding a request for acquiring an authorized private key. When the data device in the system intends to perform data encryption storage or secured data transmission, the QSKD device (e.g., calling it the first QSKD device for illustration purpose) connected therewith can send the request for acquiring an authorized private key to the QSKS device. The request can carry identifier information (for example, ID) of the first QSKD device, and the QSKS device forwards the request to the predetermined number of QSKD devices (e.g., calling them the second QSKD devices for illustration purpose). For example, by using a (n, t) threshold mechanism, the system private key is shared by n QSKD devices, the QSKS device forwards the request for acquiring an authorized private key to any t ones of the n QSKD devices. The t QSKD devices (i.e., the second QSKD devices) and the requester (i.e., the first QSKD device) are directly connected with each other or connected with each other through a routing device having a quantum key relaying function.

In some embodiments, the first QSKD device is configured to acquire, from the t second QSKD devices, identity-based authorized sub-private keys generated in accordance with the plurality of system sub-private keys in accordance with the quantum key agreement, and reconstruct an identity-based authorized private key by using the threshold secret sharing mechanism.

In some embodiments, when a QSKD device is not the requester of the authorized private key, the QSKD device (i.e., a second QSKD devices), after receiving the request for acquiring an authorized private key forwarded by the QSKS device, generates an identity-based authorized sub-private key in accordance with identifier information of the requester of the authorized private key, timestamp information and the system sub-private key that the QSKM device distributes to it. For example, an identity-based authorized sub-private key can be generated by using Formula 5, in which $s_{i_r}$ (value of r is in a range of 1-t) is the system sub-private key, $U_{ID}$ is the identifier information of the first QSKD device that serves as the requester of the authorized private key, expire_time is timestamp information, and $S_{ur}$ is the identity-based authorized sub-private key based on the identifier information of the requester.

$$S_{ur} = s_{i_r}(u_{ID}/\text{expire\_time}) \quad \text{Formula 5}$$

In some embodiments, when a QSKD device is a requester of the authorized private key (i.e., the first QSKD device), the QSKD device is configured to acquire, from other QSKD devices, a predetermined number (e.g., t) of identity-based authorized sub-private keys in accordance with quantum key agreement, and reconstruct the identity-based authorized private key by using the threshold secret sharing mechanism. The identifier information of the requester and the identifier information of the first QSKD device are interchangeably used in this application. They can be the same or different. When they are different, they are interchangeable for the purpose in this application.

In some embodiments, after t second QSKD devices generate the authorized sub-private keys based on the identity of the requester as described above, they share the authorized sub-private keys with the requester (i.e. the first QSKD device), respectively in accordance with the quantum key agreement, so that the requester acquires t identity-based system sub-private keys. It is also feasible to use redundancy transmission or on-demand retransmission, so as to ensure that the second QSKD devices correctly share the generated authorized sub-private keys with the first QSKD device.

In some embodiments, when the first QSKD device reconstructs the identity-based authorized private key, a secret reconstruction algorithm corresponding to the secret sharing algorithm used by the QSKM device to split the identity-based system private key is adopted. In one example, the QSKM adopts a secret sharing algorithm of a threshold secret sharing mechanism based on Lagrange interpolation, and corresponding thereto, the requester (i.e. the first QSKD device) adopts a reconstruction algorithm of the threshold secret sharing mechanism based on Lagrange interpolation to reconstruct the identity-based authorized private key.

In some embodiments, in accordance with t $S_{ur}$ acquired from t second QSKD devices, which is equivalent to knowing coordinates of any t points, i.e., $(x_{i1}, S_{u1})$, $(x_{i2}, S_{u2})$ ... $(x_{it}, S_{ut})$, a corresponding f(x) can be obtained by using a Lagrange interpolation formula, and the reconstructed authorized private key $S_u = f(0)$. Based on the foregoing principle, the reconstructed identity-based authorized private key $S_u$ can be obtained by using Formula 6 and Formula 7.

$$S = \sum_{r=1}^{t}\left(\prod_{j \neq r, j=1}^{t} \frac{x - x_{i_j}}{x_{i_r} - x_{i_j}}\right) s_{i_r} \quad \text{Formula 6}$$

$$S_u = s(u_{ID}/\text{expire\_time}) \quad \text{Formula 7}$$
$$= \sum_{r=1}^{t}\left(\prod_{j \neq r, j=1}^{t} \frac{x - x_{i_j}}{x_{i_r} - x_{i_j}}\right) s_{i_r}(u_{ID}/\text{expire\_time})$$

The requester (i.e. the first QSKD device) can be further configured to generate an identity-based signature certificate in accordance with the reconstructed authorized private key, so that the requester acquires the identity-based authorized private key and the certificate.

In some embodiments, as the QSKS device, the QSKD device and the QSKM device may communicate with one another because of management demands inside the system, and in order to ensure security of the communication, the QSKS device and the QSKD device may also generate their own identity-based private keys.

In some embodiments, the QSKD devices and the QSKS device are further configured to: acquire a random number generated by a quantum noise source and timestamp information from the QSKM device in accordance with the quantum key agreement, and generate identity-based private keys in accordance with the foregoing information and their own identifier information. For example, the QSKD devices and the QSKS device can generate their own identity-based private keys by using Formula 8, in which $U_r$ is a random number generated by the QSKM device for the QSKD devices or the QSKS device by using the quantum noise source, expire_time is timestamp information, and $U_{ID}$ is identifier information (for example, ID) of the QSKD devices or the QSKS device, in which the identifier information may be preset or may be issued thereto by the QSKM device.

$$U_{PK}=U_r \oplus (U_{ID}/\text{expire\_time}) \quad \text{Formula 8}$$

In one embodiment, the QSKM device can also compute $U_{Pk}$ for the QSKD devices or the QSKS device by using Formula 8, and it is also feasible by the QSKM device to use the $U_{Pk}$ as a shared key between the QSKM device and the QSKD devices or the QSKS device to perform secured data transmission therebetween.

In some embodiments, the quantum key distribution system is applied to a cloud network architecture, including a cloud backbone network (data center) and a cloud user.

For example, the quantum key distribution system can be deployed in a cloud backbone network (e.g., cloud computing data center), the data device refers to a server of the cloud computing data center, and the QSKM device inside the system can distribute the plurality of system sub-private keys to QSKD devices inside the system in advance. When a certain server of the cloud computing data center needs to acquire an identity-based authorized private key before data storage or transmission, a QSKD device connected therewith can acquire a predetermined number of identity-based authorized sub-private keys from other QSKD devices, reconstruct the identity-based authorized private key by using a threshold secret sharing mechanism and generate a signature certificate.

In another example, the system further includes a cloud user that accesses the system, and the cloud user can have his/her own QSKD device or ent a QSKD device in the system.

For the cloud user that has a QSKD device, his/her QSKD device is connected with one routing device of the cloud computing data center. The QSKD device of the cloud user is configured to send a request for acquiring an authorized private key to a QSKS device of the cloud computing data center, acquire a predetermined number of identity-based authorized sub-private keys from QSKD devices of the cloud computing center in accordance with a quantum key agreement, reconstruct an identity-based authorized private key by using a threshold secret sharing mechanism, and generate an identity-based signature certificate.

When the QSKD device of the cloud user sends the request for acquiring an authorized private key to the QSKS device of the cloud computing data center. The request can carry identifier information of the QSKD device and/or the cloud user that uses the QSKD device. The identifier information can be registered to a QSKM device of the cloud computing data center or issued by the QSKM device.

For the cloud user that rents a QSKD device of the cloud computing data center, a request for acquiring an authorized private key can be sent to a QSKS device of the cloud computing data center. The QSKS device is configured to forward the request to a predetermined number of QSKD devices connected therewith. The QSKD devices share identity-based authorized sub-private keys with the rented QSKD device in accordance with a quantum key agreement. The rented QSKD device then reconstructs an identity-based authorized private key. The QSKD device can also generates an identity-based signature certificate. The QSKD device may store the key and certificate locally to allow the cloud user to access and use. Similar to the cloud user that has a QSKD device, identifier information of the cloud user that rents a QSKD device can be issued by a QSKM device of the cloud computing data center.

In some embodiments, the quantum key distribution system provided by combining a quantum key distribution technology with a threshold secret sharing mechanism, not only can effectively reduce the risk that the classical cryptography is cracked, but also can decentralize management rights due to distributed management over the key, thus effectively reducing the possibility that an administrator acquires and maliciously gives away user data and further guaranteeing security of the user data. Especially when the system is applied to a cloud computing environment, as a user private key is generated by a cloud backbone network in a distributed manner and is finally synthesized by a QSKD device of the user or a QSKD device trusted by the user, the trust problems of cloud users for cloud providers can be solved, and after an encrypted key of user data is lost, the key can be retrieved from the cloud backbone network, so as to recover the user data.

Figure 5:
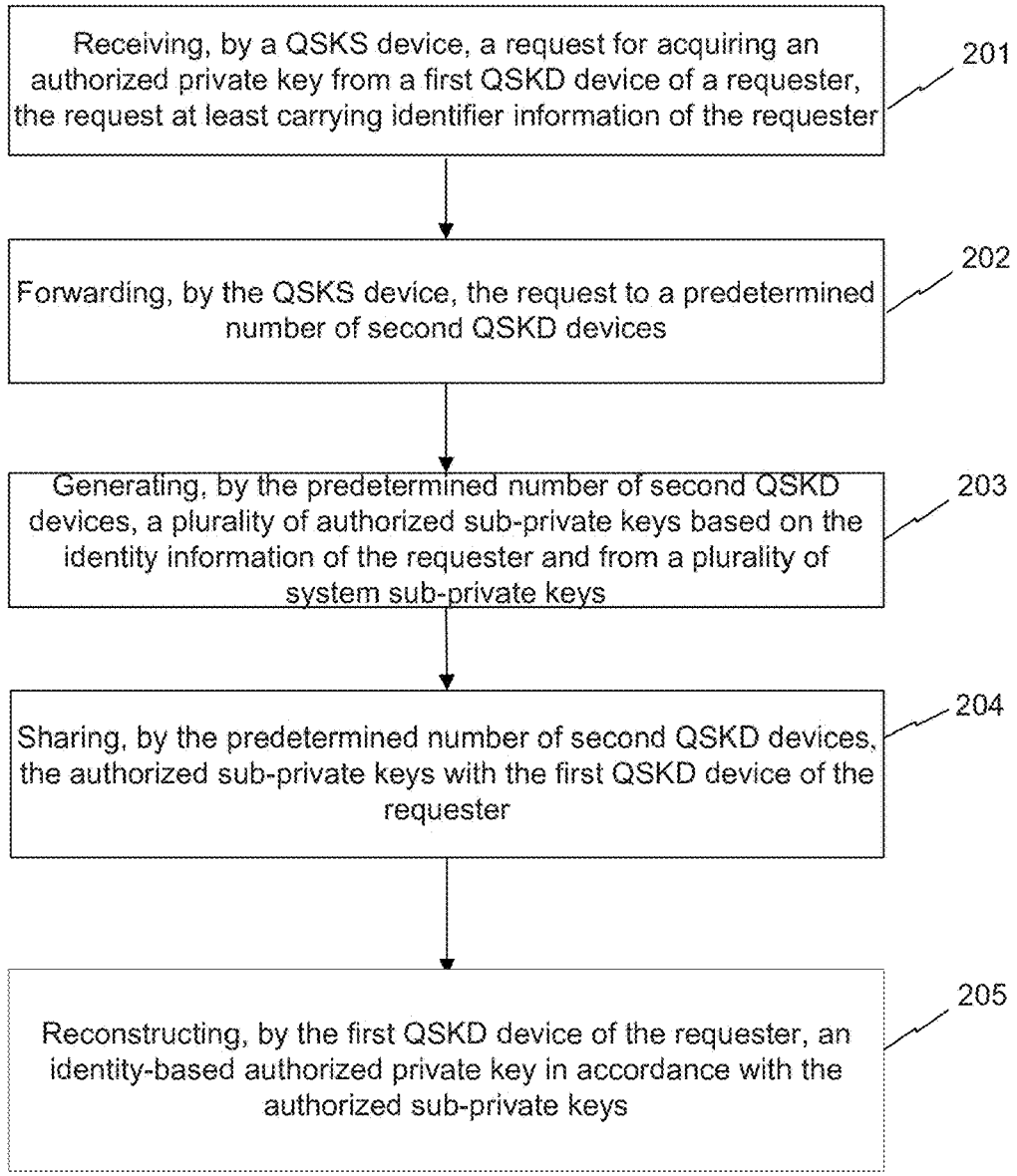
FIG. 5 is a flow diagram illustrating a quantum key distribution method, according to an exemplary embodiment.

FIG. 5 is a flow diagram illustrating a quantum key distribution method 200, according to an exemplary embodiment. Some steps may be optional.

At step 201, a QSKS device receives a request for acquiring an authorized private key from a QSKD device of a requester (e.g., called a first QSKD device for illustration purpose), the request carrying identifier information of the first QSKD device or the requester (assuming the requester for this example).

At step 202, the QSKS device forwards the request to a predetermined number of QSKD devices (e.g., called second QSKD devices for illustration purpose).

At step 203, the predetermined number of second QSKD devices generate a plurality of authorized sub-private keys based on the identifier information of the requester and from a plurality of system sub-private keys.

In some embodiments, after a second QSKD device receives the request forwarded by the QSKS device, the second QSKD device first verifies validity of the identity of the requester through the QSKM device; if the requester does not pass the identity verification, execution of the method is ended. The second QSKD devices generate the authorized sub-private keys in accordance with the identifier information of the requester, the pre-acquired system sub-private keys and timestamp information. For example, the authorized sub-private keys are generated by using the following formula:

$$S_{ur}=s_{i_r}(u_{ID}/\text{expire\_time})$$

in which $S_{i_r}$ is the system sub-private key acquired by the QSKD device in an initialization stage, $U_{ID}$ is the identifier information of the requester, expire_time is timestamp information, and $S_{ur}$ the identity-based authorized sub-private key based on the identifier information of the requester.

At step 204, the predetermined number of second QSKD devices share the authorized sub-private keys with the first QSKD device of the requester in accordance with a quantum key agreement. The quantum key agreement can be a redundancy transmission or on-demand retransmission agreement.

At step 205, the first QSKD device of the requester reconstructs an identity-based authorized private key by using the threshold secret sharing mechanism in accordance with the acquired authorized sub-private keys.

For example, the first QSKD device can reconstruct the identity-based authorized private key by using a reconstruction algorithm of the threshold secret sharing mechanism based on Lagrange interpolation and generate an identity-based signature certificate in accordance with the identity-based authorized private key.

In some embodiments, the quantum key distribution method described in the foregoing example can be applied to a cloud computing network, so as to solve key security problems in cloud computing environments, trust problems of cloud users for cloud providers, problems of malicious administrators inside a cloud, and problems damaged or lost key. The method can be applied to a cloud computing data center (i.e., a cloud backbone network). For example, the request for acquiring an authorized private key can be initiated by a QSKD device connected with a cloud data center server, and the request carries identifier information of the QSKD device. The QSKD device acquires a predetermined number of authorized sub-private keys from other QSKD devices, and reconstructs an identity-based authorized private key by using a threshold secret sharing mechanism.

In some embodiments, the system can further include a cloud user that accesses the system, and the cloud user can have his/her own QSKD device or rent a QSKD device in the system. When the cloud user that has a QSKD device needs to acquire an authorized private key, the cloud user can send a registration request to a QSKM device of the cloud computing data center through his/her own QSKD device, and the QSKM device generates and distributes corresponding identifier information for the QSKD device or the cloud user in accordance with the received request. The cloud user can then initiate a request for acquiring an authorized private key to the cloud computing data center through the QSKD device of the cloud user in accordance with data encryption demands thereof. The request can carry the aforementioned acquired identifier information. The QSKD device of the cloud user can receive a predetermined number of authorized sub-private keys from the QSKD devices of the cloud computing data center, and reconstruct an identity-based authorized private key by using a threshold secret sharing mechanism. The QSKD device of the cloud user can also generate an identity-based signature certificate.

In some embodiments, when the cloud user that rents a QSKD device of the cloud computing data center needs to acquire an authorized private key, the cloud user can first send a registration request to a QSKM device of the cloud computing data center, and the QSKM device generates and distributes corresponding identifier information to the cloud user. The cloud user can then initiate a request for acquiring an authorized private key to the cloud computing data center in accordance with data encryption demands thereof. The request can carry the aforementioned acquired identifier information. The QSKD device rented by the cloud user, in accordance with the predetermined number of authorized sub-private keys acquired from the cloud computing data center, reconstructs an authorized private key based on the identifier information of the cloud user by using a threshold secret sharing mechanism, generates a corresponding signature certificate, and stores the generated authorized private key and signature certificate locally, to allow the cloud user that serves as a tenant to access and use.

Figure 6:
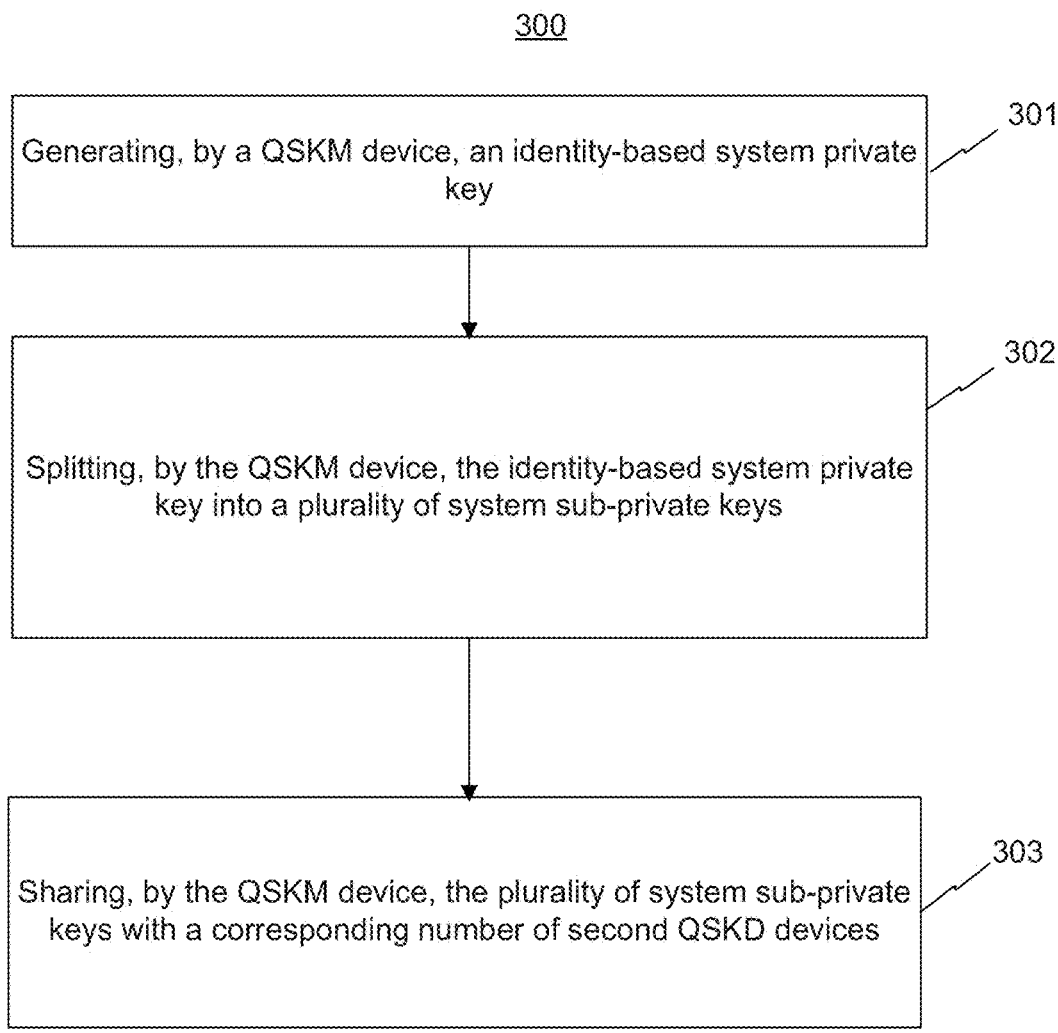
FIG. 6 is a flow diagram illustrating a quantum key distribution method, according to another exemplary embodiment.

FIG. 6 is a flow diagram illustrating a quantum key distribution method 300, according to another exemplary embodiment. Some of the steps may be optional. The steps of method 300 may be implemented before and lead to the step 201 of FIG. 5.

At step 301, a QSKM device generates a system private key.

In some embodiments, the system private key may be preset and may also be generated by the QSKM device that executes this step in accordance with a random number generated by a quantum noise source, identifier information of the system and timestamp information. For example, the QSKM device can generate the system private key by using the following formula:

$$S=S_r \oplus (BN_{ID}/\text{expire\_time})$$

in which $S_r$ is the random number generated by the quantum noise source, $BN_{ID}$ is the identifier information of the system, expire_time is timestamp information, and S is the identity-based system private key.

At step 302, the QSKM device splits the identity-based system private key into a plurality of system sub-private keys, i.e., the plurality of system sub-private keys in step 203 of FIG. 5.

The QSKM device splits the identity-based system private key into the plurality of system sub-private keys in accordance with the threshold secret sharing mechanism. For example, the splitting is performed by using a secret sharing algorithm of a threshold secret sharing mechanism based on Lagrange interpolation.

At step 303, the QSKM device shares the plurality of system sub-private keys with a corresponding number of second QSKD devices.

In some embodiments, after the system private key is split into the plurality of system sub-private keys, the QSKM device shares the plurality of system sub-private keys with a corresponding number of second QSKD devices respectively in accordance with the quantum key agreement. In some embodiments, the quantum key agreement can be a redundancy transmission or on-demand retransmission agreement.

In some embodiments, in an initialization stage, in addition to completing the above basic processing; each device in the system can further execute the following initialization operations:

generating, by the QSKM device, an identity-based private key thereof and a corresponding signature certificate by using a random number generated by a quantum noise source, identifier information of the QSKM device and timestamp information;

receiving, by the QSKM device, a registration request from the first QSKD device or the QSKS device, and generating and distributing corresponding identifier information for the device that initiates the registration request; and sharing, by the QSKM device, a random number generated by the quantum noise source and timestamp information with the first QSKD device or the QSKS device that initiates the registration request in accordance with the quantum key agreement, and generating, by the first QSKD device or the QSKS device that initiates the registration request, an identity-based private key in accordance with the acquired identifier information, the random number and the timestamp information. In some embodiments, the above described process in the initialization stage can be applied to some other or all QSKD and QSKS devices.

In some embodiments, the initialization process described above may be executed only once, or be executed regularly for the sake of security. After the initialization operations are completed, the requester (for example, the first QSKD device) that needs to acquire the identity-based authorized private key can acquire the authorized private key with the method described above. In this step, the QSKS device receives a request for acquiring an authorized private key, the request at least carrying identifier information of a requester, for example, if the request is sent by the first QSKD device, the request carries an ID of the first QSKD device.

Figure 7:
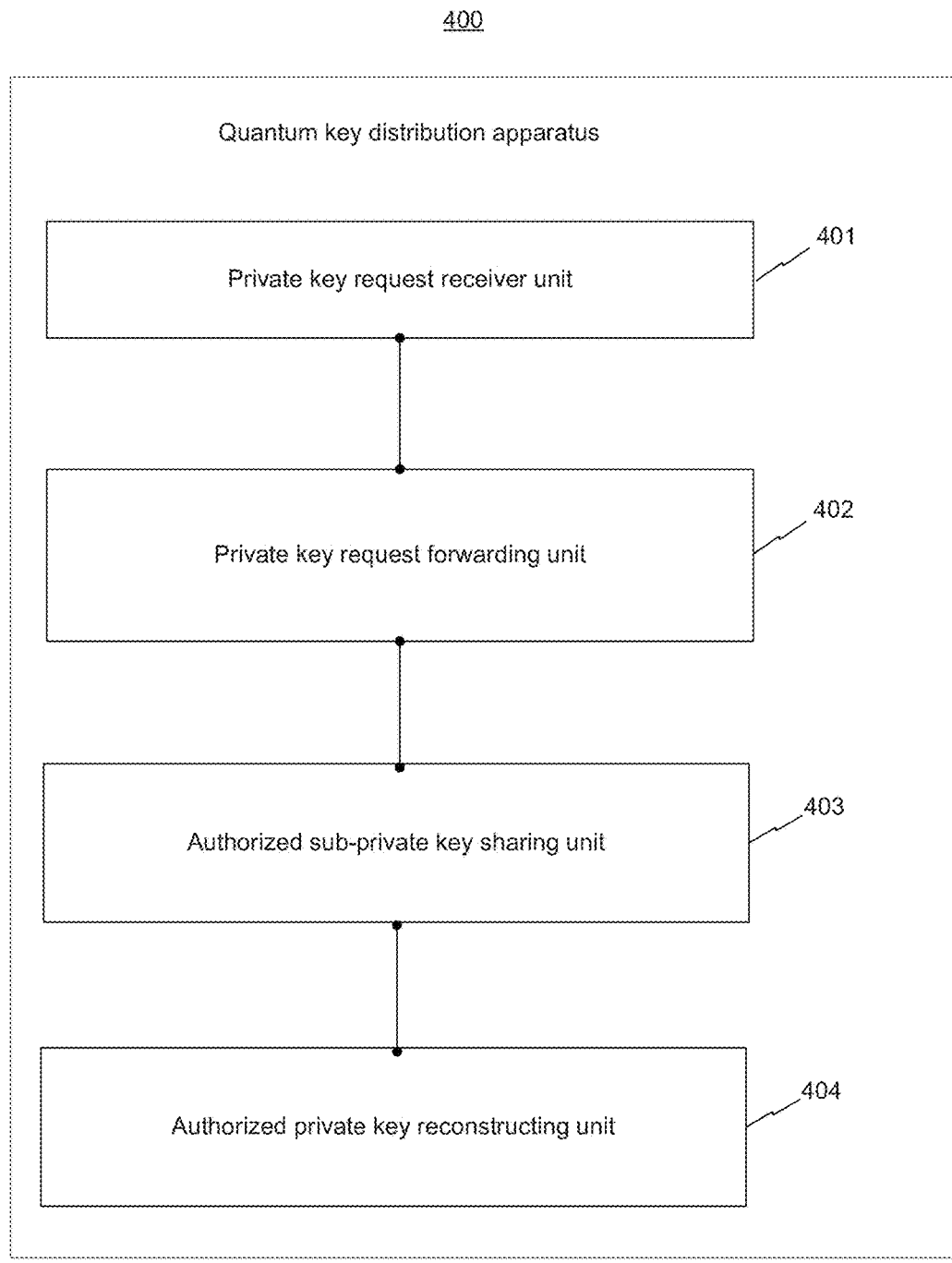
FIG. 7 is a block diagram illustrating a quantum key distribution apparatus, according to an exemplary embodiment.

FIG. 7 is a block diagram illustrating a quantum key distribution apparatus 400, according to an exemplary embodiment. The quantum key distribution apparatus of this example includes: a private key acquisition request receiver unit 401, a private key acquisition request forwarding unit 402, one or more authorized sub-private key sharing units 403, and an authorized private key reconstruction unit 404.

The private key acquisition request receiver unit 401 may be configured to receive a request for acquiring an authorized private key. The request may at least carry identifier information of a requester. The private key acquisition request forwarding unit 402 may be configured to forward the request to the predetermined number of quantum security key distribution devices. The authorized sub-private key sharing units 403 may be configured to generate, authorized sub-private keys based on the identifier information of the requester in accordance with pre-acquired system sub-private keys, and share the authorized sub-private keys with a quantum security key distribution device of the requester in accordance with quantum key agreement. The system sub-private keys may be obtained through splitting a system private key by using a threshold secret sharing mechanism. The authorized private key reconstruction unit 404 may be configured to reconstruct an identity-based authorized private key by using the threshold secret sharing mechanism in accordance with the acquired predetermined number of authorized sub-private keys.

The private key acquisition request receiver unit 401 and the private key acquisition request forwarding unit 402 may belong to a QSKS device. The one or ore authorized sub-private key sharing units 403 may belong to one or more QSKD devices. The authorized private key reconstruction unit 404 may belong to a QSKD device of an authorized private key requester.

In some embodiments, the apparatus 400 may also include a system sub-private key splitting unit configured to split an identity-based system private key into a plurality of system sub-private keys in accordance with the threshold secret sharing mechanism. The apparatus 400 may also include a system sub-private key sharing unit configured to share the plurality of system sub-private keys with a corresponding number of QSKD devices in accordance with a quantum key agreement. The system sub-private key splitting unit and system sub-private key sharing unit may belong to a QSKM device.

In some embodiments, the quantum key agreement adopted by the authorized sub-private key sharing unit and the system sub-private key sharing unit may be a quantum key agreement of redundancy transmission or on-demand retransmission.

In some embodiments, the system sub-private key splitting unit may further include a system private key generation subunit, which is configured to generate the system private key in accordance with a random number generated by a quantum noise source, identifier information of the system, and timestamp information.

In some embodiments, the system private key generation subunit is further configured to generate the system private key by using the following formula:

$$S = S_r \oplus (BN_{ID}/\text{expire\_time})$$

in which $S_r$ is the random number generated by the quantum noise source, $BN_{ID}$ is the identifier information of the system, expire_time is timestamp information, and S is the identity-based system private key.

In some embodiments, the apparatus 400 may further include a private key management unit that, before the private key request receiver unit receives the request, generates an identity-based private key and a corresponding signature certificate by using a random number generated by a quantum noise source, identifier information, and timestamp information.

In some embodiments, the apparatus 400 may further include the following units, which can be included in a QSKM device:

a registration request receiving unit, configured to, before the private key acquisition request 401 receiving unit is triggered, receive a registration request from the QSKD devices or the QSKS device, an identity information distribution unit configured to generate and distribute corresponding identifier information for the device that initiates the registration request, and an information sharing unit configured to share a random number generated by a quantum noise source and timestamp information with the device that initiates the registration request in accordance with quantum key agreement.

In some embodiments, an exemplary QSKD device may initiate the request (i.e. being a requester) and may include:

a requester private key generating unit configured to generate an identity-based private key in accordance with the acquired identifier information, the random number, and the timestamp information;

In some embodiments, the apparatus 400 may further include:

an identity verification unit configured to, before the authorized sub-private key sharing unit is triggered, verify validity of the identity of the requester through the QSKM device; and if the requester does not pass the identity verification, to end operation of the apparatus.

In some embodiments, the authorized sub-private key sharing unit may be further configured to generate the authorized sub-private keys based on the identity of the requester in accordance with identifier information of the requester, the pre-acquired system sub-private keys, and timestamp information.

In some embodiments, the authorized sub-private key sharing unit may be further configured to generate the authorized sub-private keys based on the identity of the requester by using the following formula:

$$S_{ur} = s_{i_r}(u_{ID}/\text{expire\_time})$$

in which $s_{i_r}$ is the system sub-private key, $U_{ID}$ is the identifier information of the requester, expire_time is a timestamp, and $S_{ur}$ is the authorized sub-private key based on the identity of the requester.

In some embodiments, the system sub-private key splitting unit may be further configured to split a system sub-private key obtained based on the system private key by using a secret sharing algorithm of a threshold secret sharing mechanism based on Lagrange interpolation, and correspondingly, the authorized private key reconstruction unit may be further configured to reconstruct the identity-based authorized private key by using a reconstruction algorithm of the threshold secret sharing mechanism based on Lagrange interpolation.

In some embodiments, the apparatus 400 may further include a signature certificate generating unit configured to, after the authorized private key reconstruction unit reconstructs the identity-based authorized private key, generate an identity-based signature certificate in accordance with the reconstructed identity-based authorized private key.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more computer available storage media (including but not limited to a magnetic disk memory, a CD-ROM, an optical memory and so on) containing computer available program codes.

Embodiments of the present disclosure are described with reference to flow diagrams and/or block diagrams of methods, devices (systems) and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer readable memory that can direct a computer or other programmable data processing devices to function in a particular manner, such that the instructions stored in the computer readable memory produce a manufactured product including an instruction means which implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams.

In a typical configuration, a computer device includes one or more Central Processing Units (CPUs), an input/output interface, a network interface and a memory. The memory may include forms of a volatile memory, a random access memory (RAM) and/or non-volatile memory and the like, such as a read-only memory (ROM) or a flash RAM in a computer readable medium. The memory is an example of the computer readable medium.

The computer readable storage medium refers to any type of physical memory on which information or data readable by a processor may be stored. Thus, a computer readable storage medium may store instructions for execution by one or more processors, including instructions for causing the processor(s) to perform steps or stages consistent with the embodiments described herein. The computer readable medium includes non-volatile and volatile media, removable and non-removable media, wherein information storage can be implemented with any method or technology. Information may be modules of computer readable instructions, data structures and programs or other data. Examples of a computer storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices or any other non-transmission media which may be used to store information capable of being accessed by a computer device. The computer readable medium is non-transitory, and does not include transitory media, such as modulated data signals and carrier waves.

It will be further noted that the terms "comprises", "comprising" or any other variations are intended to cover non-exclusive inclusions, so as to cause a process, method, commodity or device comprising a series of elements to not only comprise those elements, but also comprise other elements that are not listed specifically, or also comprise elements that are inherent in this process, method, commodity or device. Therefore, the element defined by a sentence "comprising a . . . " does not preclude the presence of other same elements in the process, method, commodity or device including said elements under the condition of no more limitations.

When the embodiments are implemented by software, the software may be stored in the above-described computer-readable media. The software, when executed by the processor can perform the disclosed methods. The computing units and the other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

The specification has described methods, apparatus, and systems for quantum key distribution. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A quantum key distribution system, comprising:
   a quantum security key management device;
   a plurality of quantum security key distribution devices connected with the quantum security key management device; and
   a quantum security key service device connected with the quantum security key management device and the plurality of quantum security key distribution devices, wherein:
      the quantum security key management device is configured to split an identity-based system private key into a plurality of system sub-private keys, and distributes the plurality of system sub-private keys to a corresponding number of the quantum security key distribution devices;
      the quantum security key service device is configured to forward a request for acquiring an authorized private key from a first quantum security key distribution device of the plurality of quantum security key distribution devices to a predetermined number of second quantum security key distribution devices of the plurality of quantum security key distribution devices;
      the predetermined number of second quantum security key distribution devices are configured to each generate, based on the identity of the first quantum security key distribution device, an identity-based authorized sub-private key from the system sub-private key; and
      the first quantum security key distribution device is configured to acquire, from the predetermined number of second quantum security key distribution devices, the identity-based authorized sub-private keys, and reconstructs an identity-based authorized private key based on the identity-based authorized sub-private keys.

2. The quantum key distribution system of claim 1, wherein at least one of the plurality of quantum security key distribution devices includes the quantum security key service device.

3. The quantum key distribution system of claim 1, wherein the quantum security key management device is further configured to split the identity-based system private key by using a threshold secret sharing mechanism and the first quantum security key distribution device is further configured to reconstruct an identity-based authorized private key by using the threshold secret sharing mechanism.

4. The quantum key distribution system of claim 1, wherein the first quantum security key distribution device is further configured to generate an identity-based signature certificate in accordance with the reconstructed identity-based authorized private key.

5. The quantum key distribution system of claim 1, wherein the quantum security key management device is further configured to generate the identity-based system private key based on identifier information of the quantum key distribution system, a random number generated by a quantum noise source, and timestamp information.

6. The quantum key distribution system of claim 5, wherein the quantum security key management device is further configured to generate the identity-based system private key based on a formula:

$$S = S_r \oplus (BN_{ID}/\text{expire\_time})$$

wherein $S_r$ is the random number generated by the quantum noise source, $BN_{ID}$ is the identifier information of the system, expire_time is the timestamp information, and S is the identity-based system private key.

7. The quantum key distribution system of claim 1, wherein the quantum security key management device is further configured to generate the identity-based system private key based on a random number generated by a quantum noise source, identifier information of the quantum security key management device, and timestamp information.

8. The quantum key distribution system of claim 1, wherein each of the second quantum security key distribution device is further configured to generate the identity-based authorized sub-private key based on identifier information of the first quantum security key distribution device, timestamp information, and the system sub-private key.

9. The quantum key distribution system of claim 8, wherein each of the second quantum security key distribution device is further configured to generate the identity-based authorized sub-private key by a formula:

$$S_{ur} = s_{i_r}(u_{ID}/\text{expire\_time})$$

wherein $S_{i_r}$ is the system sub-private key, $U_{ID}$ is the identifier information of the first quantum security key distribution device, expire_time is the timestamp information, and $S_{ur}$ is an identity-based authorized sub-private key.

10. The quantum key distribution system of claim 1, wherein:
   the quantum security key management device is further configured to generate identifier information of a quantum security distribution device or a quantum security key service device in accordance with a registration request received from the quantum security key distribution device or the quantum security key service device; and
   the quantum security key distribution device and the quantum security key service device are further configured to:
      acquire a random number generated by a quantum noise source and timestamp information from the quantum security key management device, and
      generate an identity-based private key or a shared key in accordance with the identifier information, the random number, and the timestamp information.

11. The quantum key distribution system of claim 1, wherein:
the quantum security key management device is further configured to split the identity-based system private key into a plurality of system sub-private using a threshold secret sharing mechanism based on Lagrange interpolation; and
the first quantum security key distribution device is configured to reconstruct an identity-based authorized private key based on the identity-based authorized sub-private keys using the threshold secret sharing mechanism based on Lagrange interpolation.

12. The quantum key distribution system of claim 1, wherein:
the quantum security key management device is further configured to distribute the plurality of system sub-private keys to a corresponding number of the quantum security key distribution devices in accordance with a quantum key agreement; and
the first quantum security key distribution device is configured to acquire, from the predetermined number of second quantum security key distribution devices, the identity-based authorized sub-private keys in accordance with the quantum key agreement,
the quantum key agreement being a redundancy transmission quantum key agreement or an on-demand retransmission quantum key agreement.

13. A quantum key distribution method, comprising:
receiving, by a quantum security key service device, a request for acquiring an authorized private key from a first quantum security key distribution device of a requester, the request at least carrying identifier information of the requester; and
forwarding, by the quantum security key service device, the request to a predetermined number of second quantum security key distribution devices, which generate a plurality of authorized sub-private keys based on the identifier information of the requester and a plurality of system sub-private keys that have been split from an identity-based system private key using a threshold secret sharing mechanism and that have been shared with a corresponding number of quantum key distribution devices,
wherein the plurality of authorized sub-private keys received by the first quantum security key distribution device of the requester enable the first quantum security key distribution device of the requester to reconstruct an identity-based authorized private key based on the authorized sub-private keys.

14. The quantum key distribution method of claim 13, wherein the identity-based authorized private key is reconstructed by using a threshold secret sharing mechanism.

15. The quantum key distribution method of claim 13, wherein:
the plurality of system sub-private keys have been shared with the corresponding number of second quantum security key distribution devices in accordance with the quantum key agreement,
the quantum key agreement being a redundancy transmission quantum key agreement or an on-demand retransmission quantum key agreement.

16. The quantum key distribution method of claim 15, wherein the identity-based system private key is generated based on a random number generated by a quantum noise source, identifier information of a quantum key distribution system, and timestamp information.

17. The quantum key distribution method of claim 16, wherein the quantum security key management device generates the identity-based system private key by a formula:

$$S = S_r \oplus (BN_{ID} / \text{expire\_time})$$

wherein $S_r$ is the random number generated by the quantum noise source, $BN_{ID}$ is the identifier information of the quantum key distribution system, expire_time is the timestamp information, and S is the identity-based system private key.

18. The quantum key distribution method of claim 13, before receiving, by the quantum security key service device, the request, further comprising:
generating, by a quantum security key management device, the identity-based system private key by using a random number generated by a quantum noise source, identifier information of a quantum key distribution system, and timestamp information.

19. The quantum key distribution method of claim 13, further comprising:
receiving, by a quantum security key management device, a registration request from a quantum security key distribution device or the quantum security key service device;
generating and distributing, by the quantum security key management device, identifier information for the device that initiates the registration request;
sharing, by the quantum security key management device, a random number generated by a quantum noise source and timestamp information with the device that initiates the registration request; and
generating, by the device that initiates the registration request, an identity-based private key in accordance with the identifier information, the random number, and the timestamp information.

20. The quantum key distribution method of claim 13, further comprising:
verifying validity of the identifier information of the requester by a quantum security key management device.

21. The quantum key distribution method of claim 13, wherein the plurality of authorized sub-private keys are generated further based on timestamp information.

22. The quantum key distribution method of claim 21, wherein the authorized sub-private keys are generated through a formula:

$$S_{ur} = s_{i_r}(u_{ID} / \text{expire\_time})$$

wherein $S_{i_r}$ is a system sub-private key, $U_{ID}$ is the identifier information of the requester, expire_time is the timestamp information, and $S_{ur}$ is an authorized sub-private key.

23. The quantum key distribution method of claim 13, wherein:
the plurality of system sub-private keys have been split from the system private key using the threshold secret sharing mechanism based on Lagrange interpolation; and
the identity-based authorized private key is reconstructed based on the authorized sub-private keys by using the threshold secret sharing mechanism based on Lagrange interpolation.

24. The quantum key distribution method of claim 13, further comprising generating an identity-based signature certificate in accordance with the reconstructed identity-based authorized private key.

25. The quantum key distribution method of claim 13, wherein the request for acquiring an authorized private key is initiated by a quantum security key distribution device connected with a data center server.

26. The quantum key distribution method of claim 13, wherein the request for acquiring an authorized private key is initiated by a quantum security key distribution device of a cloud user, the request carrying identifier information of the quantum security key distribution device or identifier information of the cloud user.

27. A quantum key distribution method, comprising:
splitting, by a quantum security key management device, a system private key into a plurality of system sub-private keys;
distributing, by the quantum security key management device, the plurality of system sub-private keys to a corresponding number of quantum security key distribution devices;
receiving, by a quantum security key service device, a request for acquiring an authorized private key from a first quantum security key distribution device of a requester, the request at least carrying identifier information of the requester;
forwarding, by the quantum security key service device, the request to a predetermined number of second quantum security key distribution devices of the corresponding number of quantum security key distribution devices;
receiving, by the first quantum security key distribution device, a plurality of authorized sub-private keys generated, by the predetermined number of second quantum security key distribution devices, based on the identifier information of the requester and a plurality of system sub-private keys; and
reconstructing, by the first quantum security key distribution device of the requester, an identity-based authorized private key based on the authorized sub-private keys.

28. The quantum key distribution method of claim 27, further comprising generating, by the quantum security key management device, the system private key by using a random number generated by a quantum noise source, identifier information of a quantum key distribution system, and timestamp information.

29. The quantum key distribution method of claim 27, wherein splitting, by the quantum security key management device, the system private key into the plurality of system sub-private keys includes:
splitting, by a quantum security key management device, a system private key into a plurality of system sub-private keys by using a threshold secret sharing mechanism based on Lagrange interpolation.

30. A quantum key distribution method of claim 27, wherein reconstructing, by the first quantum security key distribution device of the requester, the identity-based authorized private key based on the authorized sub-private keys includes:
reconstructing, by the first quantum security key distribution device of the requester, an identity-based authorized private key based on the authorized sub-private keys by using a threshold secret sharing mechanism based on Lagrange interpolation.

31. A quantum key distribution apparatus; comprising:
a memory storing a set of instructions;
a processor configured to execute the set of instructions to cause the apparatus to:

receive a request for acquiring an authorized private key from a first quantum security key distribution device of a requester, the request at least carrying identifier information of the requester; and
forward the request to a predetermined number of second quantum security key distribution devices, which
generate a plurality of authorized sub-private keys based on the identity of the requester and a plurality of system sub-private keys and share the authorized sub-private keys with the first quantum security key distribution device of the requester, the plurality of system sub-private keys have been split from an identity-based system private key using a threshold secrete sharing mechanism and have been shared with a corresponding number of second sub-quantum security key distribution devices,
wherein the authorized sub-private keys enable the first quantum security key distribution device of the requester to reconstruct an identity-based authorized private key based on the authorized sub-private keys.

32. The quantum key distribution apparatus of claim 31, wherein the processor is further configured to execute the set of instructions to cause the apparatus to share the authorized sub-private keys with the first quantum security key distribution device of the requester, in accordance with a redundancy transmission quantum key agreement or an on-demand retransmission quantum key agreement.

33. The quantum key distribution apparatus of claim 31, wherein the processor is further configured to execute the set of instructions to cause the apparatus to generate the system private key based on a random number generated by a quantum noise source, identifier information of the system, and timestamp information.

34. The quantum key distribution apparatus of claim 33, wherein the processor is further configured to execute the set of instructions to cause the apparatus to generate the system private key through the following formula:

$$S=S_r \oplus (BN_{ID}/\text{expire\_time})$$

wherein $S_r$ is the random number generated by the quantum noise source, $BN_{ID}$ is the identifier information of the quantum key distribution system, expire_time is the timestamp information, and S is the identity-based system private key.

35. The quantum key distribution apparatus of claim 31, wherein the plurality of system sub-private keys have been split from the system private key using a secret sharing algorithm of the threshold secret sharing mechanism based on Lagrange interpolation; and
the identity-based authorized private key is reconstructed by using a reconstruction algorithm of the threshold secret sharing mechanism based on Lagrange interpolation.

36. The quantum key distribution apparatus of claim 31, wherein the processor is further configured to execute the set of instructions to cause the apparatus to generate the authorized sub-private keys based on the identity of the requester in accordance with identifier information of the requester, the plurality of system sub-private keys, and timestamp information.

37. The quantum key distribution apparatus of claim 36, wherein the processor is further configured to execute the set of instructions to cause the apparatus to unit generate the authorized sub-private keys based on the identity of the requester through the following formula:

$$S_{u_r}=s_{i_r}(u_{ID}/\text{expire\_time})$$

wherein $S_{i_r}$ is the system sub-private key, $U_{ID}$ is the identifier information of the requester, expire_time is the timestamp information, and $S_{u_r}$ is the authorized sub-private key based on the identity of the requester.

38. A non-transitory computer readable medium storing one or more programs, the one or more programs comprising instructions which, when executed by a computer system including a quantum security key service device and a first quantum security key distribution device, cause the computer system to perform a method comprising:

receiving, by the quantum security key service device, a request for acquiring an authorized private key from the first quantum security key distribution device of a requester, the request at least carrying identifier information of the requester; and forwarding, by the quantum security key service device, the request to a predetermined number of second quantum security key distribution devices, which generate a plurality of authorized sub-private keys based on the identifier information of the requester and a plurality of system sub-private keys that have been split from an identity-based system private key using a threshold secret sharing mechanism and that have been shared with a corresponding number of quantum key distribution devices, wherein the plurality of authorized sub-private keys received by the first quantum security key distribution device of the requester enable the first quantum security key distribution device of the requester to reconstruct an identity-based authorized private key based on the authorized sub-private keys.

39. A non-transitory computer readable medium storing one or more programs, the one or more programs comprising instructions which, when executed by a computer system including a quantum security key management device, a quantum security key service device, and a first quantum security key distribution device, cause the computer system to perform a method comprising:

splitting, by the quantum security key management device, a system private key into a plurality of system sub-private keys;

distributing, by the quantum security key management device, the plurality of system sub-private keys to a corresponding number of quantum security key distribution devices;

receiving, by the quantum security key service device, a request for acquiring an authorized private key from the first quantum security key distribution device of a requester, the request at least carrying identifier information of the requester;

forwarding, by the quantum security key service device, the request to a predetermined number of second quantum security key distribution devices of the corresponding number of quantum security key distribution devices;

receiving, by the first quantum security key distribution device, a plurality of authorized sub-private keys generated, by the predetermined number of second quantum security key distribution devices, based on the identifier information of the requester and a plurality of system sub-private keys; and reconstructing, by the first quantum security key distribution device of the requester, an identity-based authorized private key based on the authorized sub-private keys.

* * * * *

UNITED STATES PATENT AND TRADEMARK OFFICE
CERTIFICATE OF CORRECTION

PATENT NO. : 10,305,873 B2
APPLICATION NO. : 14/993643
DATED : May 28, 2019
INVENTOR(S) : Yingfang Fu et al.

Page 1 of 1

It is certified that error appears in the above-identified patent and that said Letters Patent is hereby corrected as shown below:

On the Title Page

Item (30), "2015 1 0033128" should read as --201510033128.2--

Signed and Sealed this
Seventeenth Day of September, 2019

Andrei Iancu
*Director of the United States Patent and Trademark Office*